Fig.1.

May 30, 1961 R. H. KRUSE ET AL 2,986,606
RECORDING WITH AUDIBLE AND VISIBLE MONITORING
Filed Feb. 28, 1955 11 Sheets-Sheet 4

Fig. 4.

INVENTOR
RALPH H. KRUSE.
JAMES D. DIGBY.
HOWARD. N. FAWCETT.
BY
ATTORNEY

May 30, 1961 R. H. KRUSE ET AL 2,986,606
RECORDING WITH AUDIBLE AND VISIBLE MONITORING
Filed Feb. 28, 1955 11 Sheets-Sheet 6

INVENTOR
RALPH H. KRUSE.
JAMES D. DIGBY.
BY HOWARD N. FAWCETT.
ATTORNEY

May 30, 1961 R. H. KRUSE ET AL 2,986,606
RECORDING WITH AUDIBLE AND VISIBLE MONITORING
Filed Feb. 28, 1955 11 Sheets-Sheet 11

Fig. 27.

INVENTOR
RALPH H. KRUSE.
JAMES D. DIGBY.
BY HOWARD N. FAWCETT.
ATTORNEY

United States Patent Office 2,986,606
Patented May 30, 1961

2,986,606

RECORDING WITH AUDIBLE AND VISIBLE MONITORING

Ralph H. Kruse, Pelham Manor, Howard N. Fawcett, Briarcliff Manor, and James D. Digby, Croton-on-Hudson, N.Y., assignors to Cambridge Instrument Co. Inc., New York, N.Y., a corporation of New York Filed Feb. 28, 1955, Ser. No. 490,736
9 Claims. (Cl. 179—100.2)

This invention relates to recording and reproducing systems and more specifically concerns a new and improved method and portable apparatus for recording heart sounds and audibly and visibly reproducing them to provide a complete indication of the sounds produced by the heart and thereby facilitate diagnosis of heart diseases. This invention further contemplates an improved recorder and means for coordinating the recorded auscultation of the heart with electrocardiograph and other similar signals to assist in the attainment of a more accurate interpretation of heart sounds and murmurs.

The diagnosis of heart diseases constitutes one of the more difficult phases of medicine and at the present time the great preponderance of doctors must rely on the stethoscope for general work. Since the stethoscope is a mechanical sound detecting instrument having flexible elements wherein the sound transmitting characteristics change with time and since one's hearing often changes with time, detection of heart defects by means of the stethoscope is not always reliable since many murmurs are at or below the threshold of hearing. Even with murmurs slightly above the threshold, fatigue of the ear often decreases its sensitivity so that the hearing threshold is raised above the level of the murmurs. While more elaborate and accurate instruments are available at certain medical installations for detecting and recording heart sounds, in many cases a patient cannot be moved to those installations so that a course of treatment that may be dictated by a more accurate diagnosis may not be provided.

Accordingly it is one object of the invention to provide a highly portable, sensitive, and dependable heart sound recorder that may be readily transported by a single individual to the bedside of a patent so that an accurate recording can be made that is wholly independent of mechanical and other devices having substantial changes in frequency characteristics with time and ambient climatic conditions. Moreover through the provision of an accurate recording with good signal-to-noise ratio, a number of specialists may listen to the reproduction for consultation purposes without further disturbance of the patient. In addition visual reproduction coupled with sound reproduction has been found to provide a more complete picture of the heart action and may prevent diagnostic errors caused by defective hearing.

The recording of heart sounds and other sounds has also presented a serious problem in industry in that present techniques provide recording mediums that are difficult to store and handle and are not in a convenient form for mailing. While flexible plastic materials and mechanical cutting heads have been used, the quality of the recorded sounds is most inadequate for heart sound purposes and relatively poor signal-to-noise ratios are encountered. It is therefore another object of the invention to provide an improved recording medium that is highly flexible, light in weight and that may be folded without adversely affecting the recording.

A still further object of the invention resides in the provision of a new and improved magnetic recorder that is characterized by its simplicity, excellent speed control characteristics, dependability and improved cooperation of the magnetic recording medium with the recording and erasing heads. Through this new and improved design intimate contact between the medium and the head is insured at all times so that minimum loss is encountered in both recording and playback. Moreover, wrinkles in the record will not adversely affect its usefulness and negligible wear is encountered.

Still another object of the invention resides in the provision of a new and improved magnetic recording and erasing head arrangement and support for recording signals in one or more circular, concentric paths about the edge of a magnetic disc. In addition means are provided for reducing the adverse effects of stray fields on the recording and pickup head so that a relatively high signal-to-noise ratio is obtained.

A further object of the invention resides in the provision of a highly simplified sound recorder wherein the operator can quickly shift from a position for listening to the material to be recorded to the record and playback positions by the simple actuation of a single knob and at the same time control the recording and listening gain of the equipment. This is attained through a novel and improved switch that is arranged and constructed to prevent accidental movement of the switch to the recording position that would function to erase material already on the record.

A still further object of the invention is an improved method of recording and reproducing heart and other sounds wherein relatively high signal-to-noise ratios and uniform recording and reproducing gains are attained.

Still another object of the invention is the provision of an improved heart sound recorder wherein the recorded information can be played back both visually and audibly and wherein means are provided for correlating the recorded heart sound information with an electrocardiographic record and displaying the electrocardiographic record visually while listening to the sound of the heart.

Still another object of the invention resides in the provision of a heart sound recorder having an improved circuit and arrangement of elements that provide dependable and highly sensitive operation and wherein the frequency response can be modified to obtain emphasis in different parts of the sound spectrum while retaining a natural aspect of the reproduction. This circuit also includes an improved method and circuitry for operating the cathode ray tube and provides a high degree of stability and uniformity of operation.

Still another object of the invention is a new and improved heart sound recorder.

The above and other objects and advantages of the invention will become more apparent from the following description and accompanying drawings forming part of this application.

In the drawings:

Fig. 3 is a front elevation of the recorder shown in Fig. 1 with the outer case removed;

The recorder in accordance with the invention is a highly portable precision instrument adapted for recording and reproducing heart sounds. It includes means for audibly and visually displaying the sounds or other signals simultaneously prior to and during the recording period and on playback. Through a novel and improved arrangement of elements the apparatus is simply and easily operated and selected frequencies can be emphasized to detect murmurs in the heart that otherwise may be overlooked. This frequency emphasis is attained while at the same time preserving a realistic reproduction so that the operator is always presented with a clear audible and visual picture of the entire heart sound. The recording medium is arranged to provide a durable, easily handled record that can carry suitable notations identifying the recorded information and that can be folded or bent without affecting in any way the quality and perfection of the reproduction. In addition the record of the heart sounds is stored in a medium to which the doctor is accustomed and enables him to readily correlate the sound with the visual presentation. With the aid of visual presentation, very low level murmurs can be detected by ear that would normally be overlooked.

Fatigue of the ear also plays an important role in analyzing sounds and particularly heart sounds. Murmurs of the heart caused by valve stenosis or a regurgitation insufficiency follow closely in time the major heart sounds and are at a very low level with reference to the major sounds. Since a relatively high level sound tends to lower the sensitivity of the ear, the time lag in regaining sensitivity will cause the low level murmur sounds to be depressed below the hearing threshold. With the recorder in accordance with the invention, the record may be reversed so that the low level sounds will precede the higher level major sound and thereby greatly facilitate their detection.

While this recorder is small, compact and light in weight and is particularly adapted for recording of heart sounds it will become apparent that certain features of this invention are useful in other applications. In addition the recording apparatus in accordance with this invention provides an improved method and means for coupling the recorder with electrocardiograph apparatus so that an electrocardiographic record may be monitored and can be directly correlated with the heart sound record to provide a more complete picture of the heart action. With this procedure it has been found that a quicker and more positive determination of heart defects can be obtained and the many difficulties encountered in an effort to correlate two different records and uncoordinated records are completely avoided.

Figure 1:
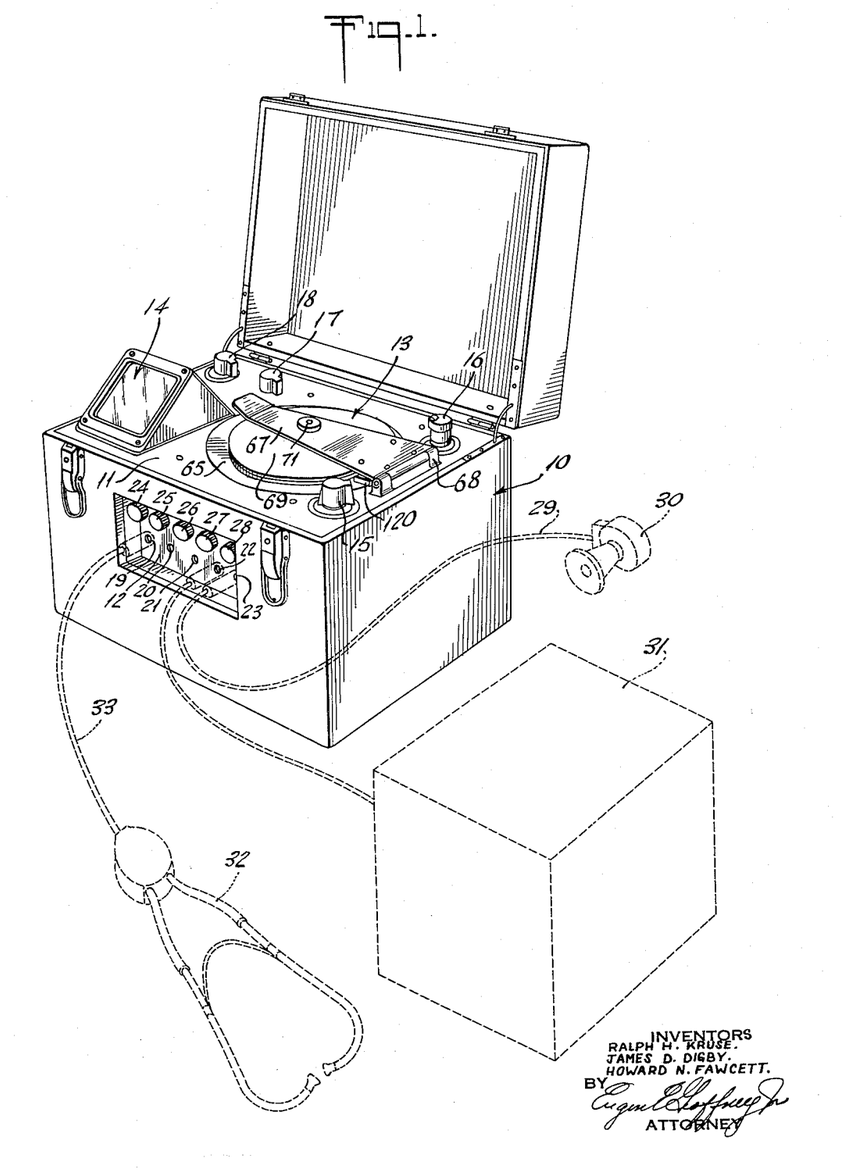
Fig. 1 is a perspective view of one embodiment of the invention and illustrates diagrammatically the interconnection of an electrocardiograph with the recording apparatus.

The portable recorder in accordance with the invention is shown generally in Fig. 1 and includes an outer case 10, a top panel 11 and a control panel 12. The top panel 11 carries the recording turntable generally denoted by the numeral 13, visual reproducing means 14, and control knobs 15, 16, 17 and 18. The side control panel 12 includes five jacks 19 to 23 inclusive and five control knobs 24 to 28 inclusive. The purposes of these various control knobs will be described as the specification proceeds.

In this specific embodiment of the invention the jack 23 is arranged to receive a cord and plug 29 for coupling a pick up microphone 30 or other signal input with the recording apparatus. The jacks 21 and 22 are for the purpose of coupling electrocardiographic apparatus 31 with the recorder and the jacks 19 and 20 provide means for attaching one or two stethophones 32 to the recorder by means of a suitable cable and plug assembly 33.

Figure 2:
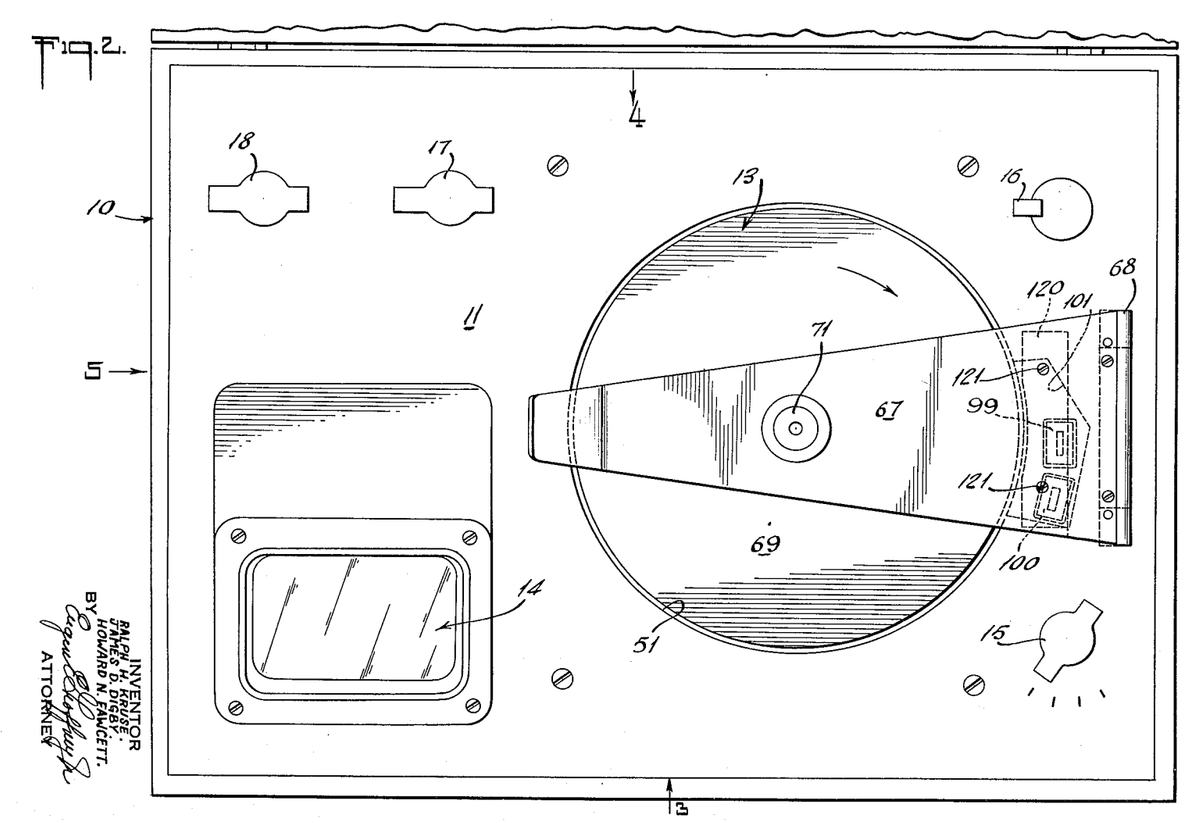
Fig. 2 is a plan view of the embodiment of the invention shown in Fig. 1.

A top view of the assembled recorder is shown in Fig. 2 and illustrates in addition to the placement of parts on the panel the position of certain elements of the recording apparatus such as the recording and erasing heads.

Figure 4:
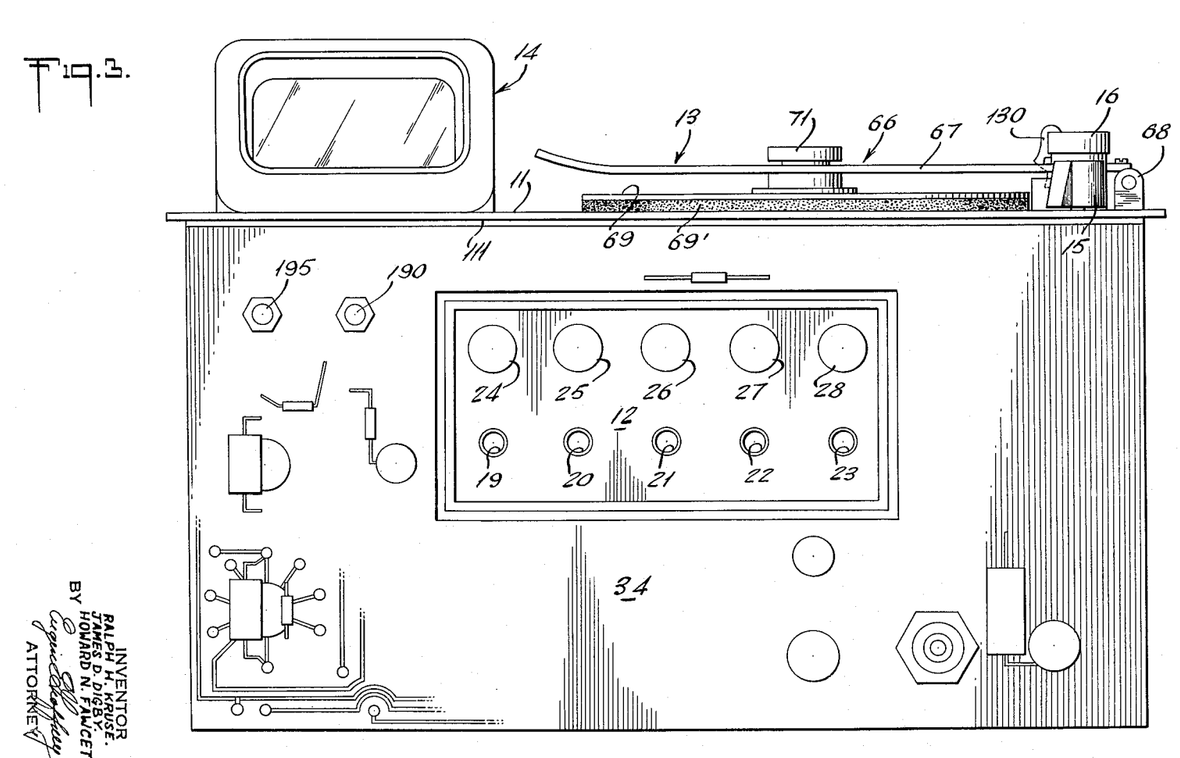
Fig. 4 is a rear view of the recorder as illustrated in Fig. 3.
Figure 5:
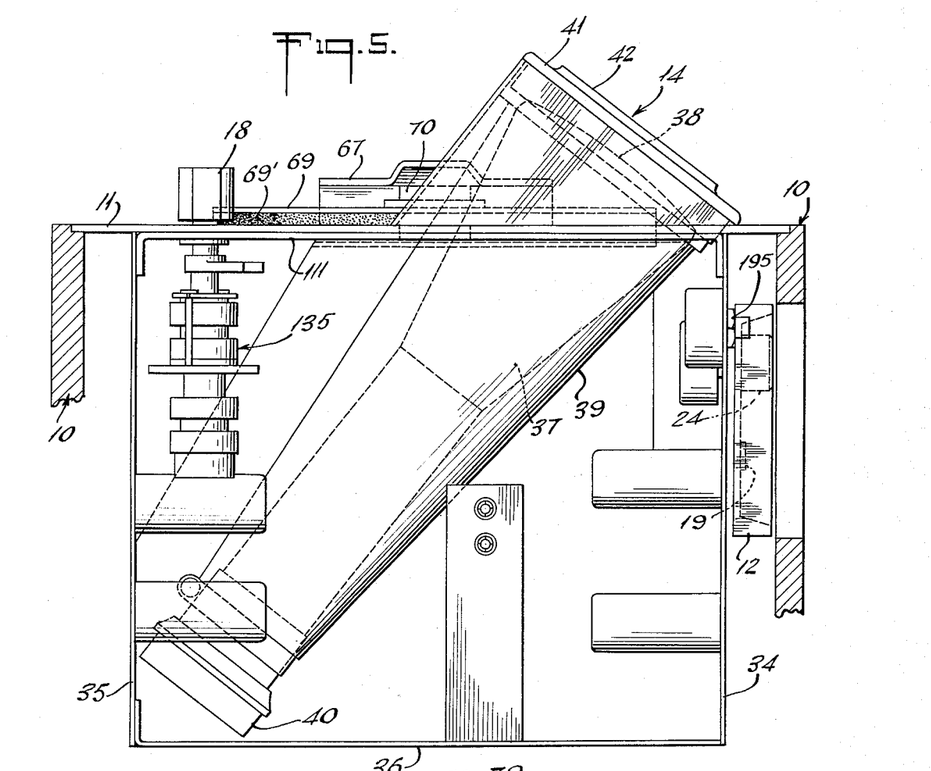
Fig. 5 is an elevational view of the left side of the apparatus as shown in Fig. 3.

The general structural details of the invention are shown generally in Figs. 3 to 5 inclusive. It will be observed in these views that the primary support for the panel 11 constitutes two plates 34 and 35 that are spaced from the front and rear edges of the panel and extend lengthwise thereof. These plates or sheets are formed of an insulating material and support the various electronic components forming the major portion of the electronic circuits for the operation of the apparatus. For illustrative purposes only certain of the electronic components and portions of the printed circuits carried by these sheets of insulating material 34 and 35 are illustrated in Figs. 3 and 4. The detailed circuitry will be described in connection with the complete circuit diagram shown in Fig. 27. The front panel 34 also supports the front control panel 12 carrying the control knobs 24 to 28 and the connecting jacks 19 to 23 inclusive. The outer cabinet 10 as will be observed includes a cut out portion on the front in order to expose these control knobs and jacks.

While the sheets 34 and 35 formed of insulating material comprise the basic supporting elements for the panel 11 and certain other elements of the apparatus, additional structural members such as a base plate 36 and miscellaneous shielding elements within the apparatus lend added rigidity. When the entire apparatus is disposed within the cabinet 10 the equipment is supported in part by the edges of the panel 10 and in part by the sheets 34 and 35 which rest on the bottom of the cabinet 10 and engage suitable stops thereon.

The cathode ray tube assembly 14 as viewed in Fig. 1 will be observed more clearly in Fig. 5 of the drawings. The cathode ray tube in this assembly is denoted by the numeral 37 and is disposed at an angle relative to the panel 11 with the face 38 thereof extending above the top of the panel. The entire tube is enclosed within metallic housing 39 preferably made of a magnetic material and connections are completed to the tube by means of a suitable socket 40 at its base. The upper portion of the tube is enclosed by a housing 41 having a window 42 therein for observing the reproduced image on the face 38 of the tube 37.

The recorder 13 as previously pointed out utilizes a flexible disk 65 of magnetic material as the recording medium. It also has provision for making the recordings in a number of discrete concentric paths about the edge of the disk so that any one of the paths can be selected at will for recording heart sounds and reproducing them. In the specific embodiment of the invention four such channels or paths are provided with the recording time being a function of the speed of rotation of the turntable. In the illustrated embodiment of the invention a recording time of about 15 seconds was selected and found to be ideal for heart records and consistent with good frequency response over the desired range.

Referring now to Figs. 6 to 15, the magnetic recorder 13 includes a turntable 50 mounted in a circular opening 51 in the panel 11 with its top edge just slightly above the top surface of the panel. It is rotatably supported by a centrally disposed shaft assembly 52. This shaft assembly includes an upper section or turntable hub 53 of somewhat enlarged diameter and rotatably supports the turntable 50. The upper portion of this collar 53 is tapered inwardly as indicated at 54 and terminates in a short cylindrical post or center 55 having a transverse pin 56 extending therethrough. The pin 56 is utilized engaging a cooperating ratchet on the upper plate assembly 66 of the recorder as will be described.

The turntable 50 is secured to the central hub 53 by means of a flange 57 beneath the turntable 50 and secured thereto by suitable screws or other fastening devices. Beneath the flange is a collar 58 riding on the upper surface of a transverse bracket plate 59 secured at its outer ends to the other side of the panel 11 and spaced slightly beneath it. This bracket 59 includes a central journal 60 for the receipt of a downwardly extending shaft 61 which forms part of the turntable support 52. In order to maintain the turntable in position, the shaft 61 may be provided with an annular groove 62 which cooperates with a set screw 63 in the wall of the journal 60. As will be observed in Figs. 8 through 16 the central hub 53 extends slightly above the upper surface of the turntable 50. The tapered portion 54 facilitates the alignment of the central opening 64 of the record 65 with the hub 53 and prevents accidental deformation of this opening through continued use of the record.

Figure 26:
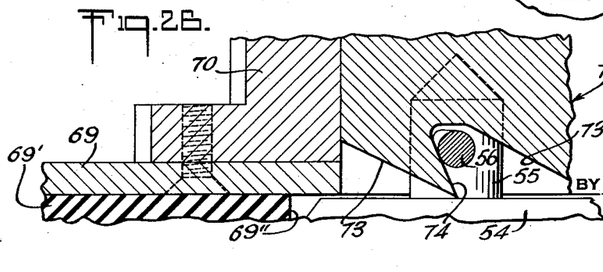
Fig. 26 is a cross sectional view of Fig. 25 taken along the line 25—25 thereof.

The record 65 is held in place on the turntable 50 by an overlying plate assembly generally denoted by the numeral 66. It comprises a diametrically disposed lever or arm 67 pivoted at one end to a bracket 68 secured directly to the panel 11. The bracket 67 is movable from a position directly overlying the center of the turntable 50 to a vertical position directly above the supporting bracket 68 as may be observed in Fig. 8 of the drawings. The bracket 67 carries the overlying plate 69 having a layer of rubber or rubber-like material 69' thereon and a central hub 70. A portion of this hub extends through a cooperating opening in the lever 67 and is rotatably secured therein by a suitable collar 71. The hub 70 in one embodiment of the invention includes on its underside a circular ratchet 72 having four triangularly shaped slots 73 for engaging the transverse pin 56 on the turntable hub 53. While the slots 73 and the ratchet 72 may be of any suitable configuration it is preferable that the leading edge 74 of each slot as will be observed in Fig. 26 should have a slight reverse taper so that upon engagement of the pin 56 it will tend to pull the upper plate 69 down firmly against the turntable 50 and thereby clamp the record 65 securely therebetween. Slip between the record 65 and the turntable 50 is prevented by the soft gripping material 69' such as felt treated with rubber or any other suitable material having a relatively high coefficient of friction.

With this arrangement a record 65 is placed in an approximately centered position over the hub 53 of the turn table 50 which may or may not be rotating. The hold down assembly 66 is then lowered until the plate 69 contacts the upper side of the record. The central opening 69'' of the plate 69 engages the edge of the opening 64 in the record 65 and pushes it down over the tapered section 54 of the turntable hub. This automatically aligns the record about the cylindrical section 53 of the turntable hub. If during this process the turntable 50 has been rotating, then upon lowering of the hold down assembly 66 the pin 56 will have engaged an oppositely disposed pair of slots 73 in the ratchet 72. Since this ratchet is fixedly connected to the hold down plate 69 the pin will drive the plate in synchronism with the turntable 50 and at the same time pull the plate snugly against the upper side of the record 65.

It has been found that this procedure for securing and holding a flexible record of circular configuration has been very effective since it provides extremely accurate alignment of the record relative to the turntable and will provide sufficient driving force to the record to prevent any possible slip relative to the magnetic recording heads even if the record may become wrinkled or creased by reason of its being folded in one manner or another for filing or shipment through the mails. It has further been found that records of this type may wrinkle or become slightly distorted by reason of changes in ambient temperature and humidity, but notwithstanding these record deformations excellent recording and reproduction is obtained at all times. While the thickness of the record stock is not critical, thicknesses of the order of .002 inch have been found desirable.

The driving means for the turntable 50 is arranged to rotate the turntable at about four revolutions per minute so that the recording time available for any individual path is approximately 15 seconds. With the use of records having a diameter of about 7½ to 8 inches recording speeds in the order of 1¾ inches per second are obtainable which provide an excellent frequency response in the range of 100 to 600 cycles, ideal for recording heart sounds. The actual recording range available utilizing the speeds as outlined above is approximately 50 to 1500 cycles.

In order to drive the turntable at a uniform speed and with good regulation it has been found that a relatively hard metal pin riding directly against the outer surface of the turntable 50 is most effective. Moreover through the use of a steel pin riding against the edge of an aluminum turntable, a firm positive drive is effected and at the same time little, if any, deformation of the periphery of the turntable is encountered even if the pin is permitted to forceably remain in contact with one point of the periphery for extended periods of time. Moreover any indentation or deformation that may be caused in this manner is of such a minute dimension that the effects will not adversely affect the reproduction of the record.

Figure 6:
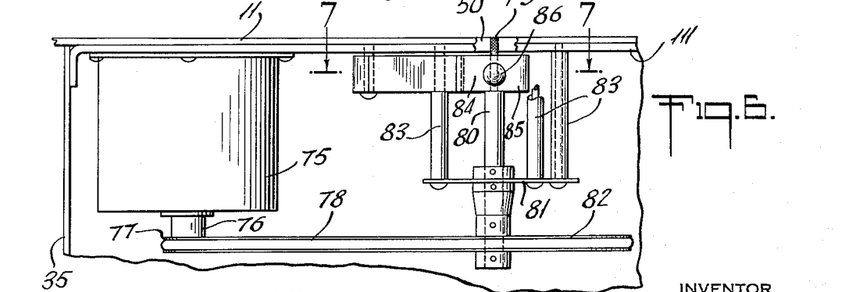
Fig. 6 is a side elevation of the driving means for the recording apparatus as shown in Figs. 1, 2 and 4.
Figure 7:
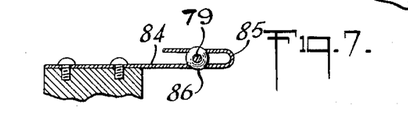
Fig. 7 is a cross sectional view of Fig. 6 taken along the lines 7—7 thereof.
Figure 8:
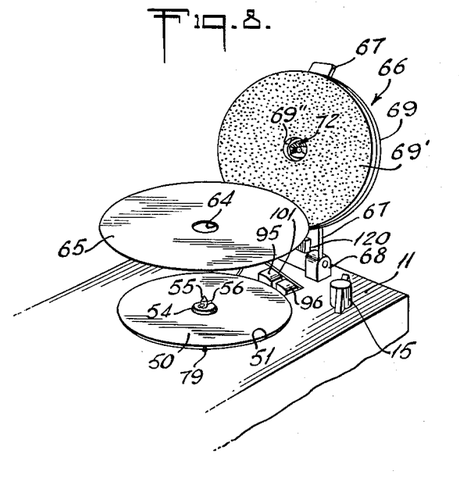
Fig. 8 is a perspective view of the recording apparatus to illustrate the application of a record thereto.
Figure 9:
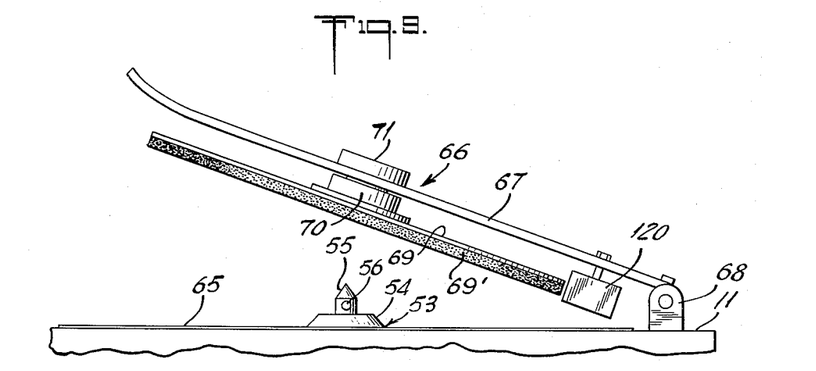
Figs. 9 and 10 are side views of the recorder of Fig. 8 showing the successive steps of securing the record in place on the turntable.
Figure 10:
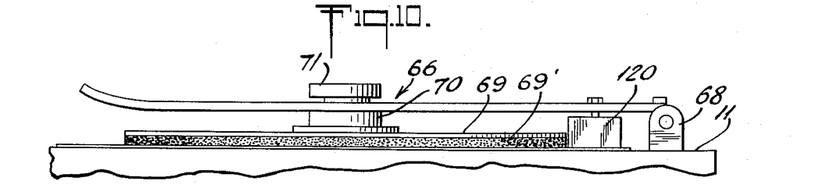
Figure 11:
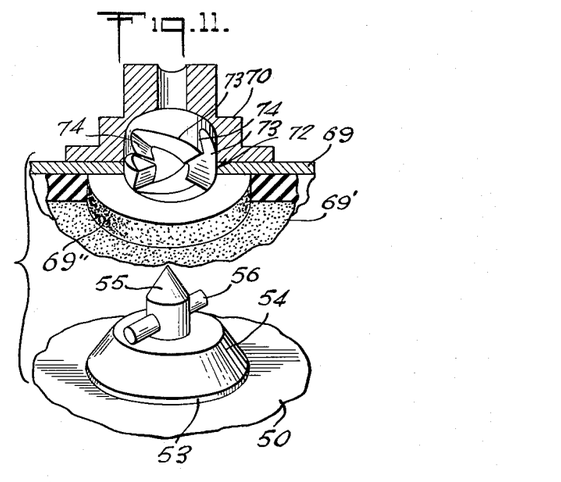
Fig. 11 is a partially sectioned perspective view of the cooperating hub elements of the turntable of Fig. 8.
Figure 12:
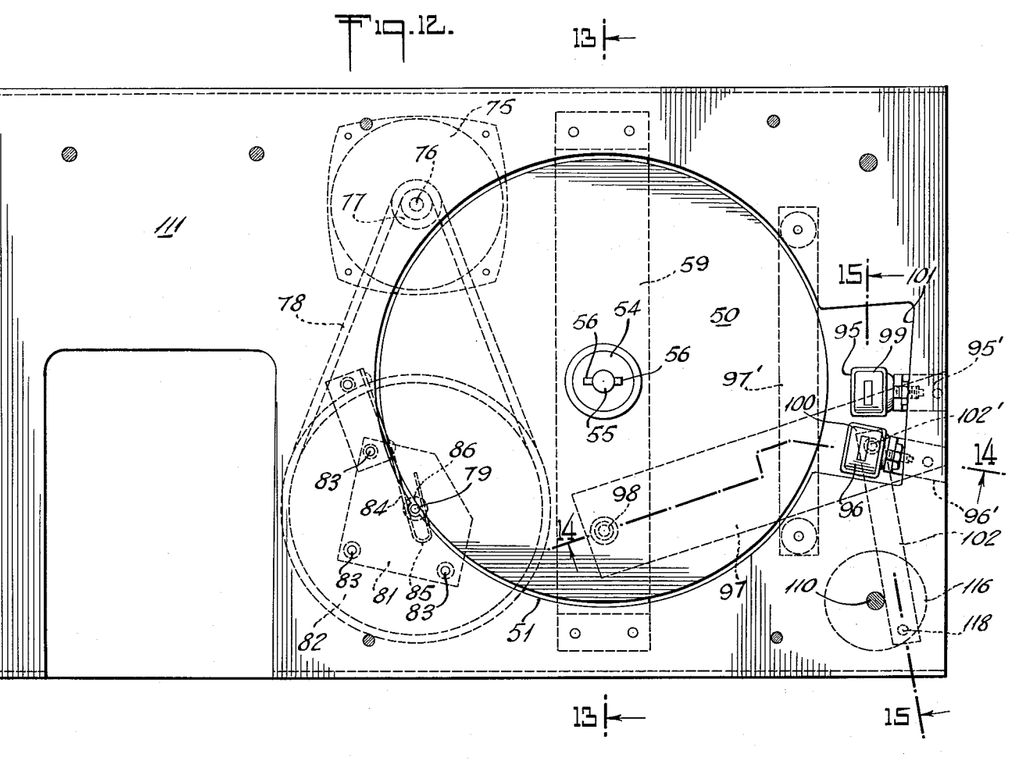
Fig. 12 is a plan view of the apparatus along the lines of Fig. 2 to illustrate the relative position of the various elements of the turntable and driving means for the recording apparatus.

The turntable driving means having a very low noise level is shown generally in Figs. 6 and 12 and includes a capacitative type motor 75 carried on the underside of the panel 11. The drive shaft 76 of the motor 75 extends downwardly and carries a pulley 77 adapted to receive a flexible belt 78. The drive pin 79 which may be knurled to provide more effective contact with the edge of the aluminum turntable 50 is carried by a vertically disposed shaft 80 journalled by a self-aligning bearing in a horizontally disposed plate 81. The lower end of shaft 80 carries an enlarged pulley 82 for engagement with the belt 78. The plate 81, of relatively large dimensions, is mounted by three upwardly extending supports 83 secured to the underside of the panel 11. In order to hold the shaft 80 and the pin 79 in position with the pin 79 riding against the edge of the turntable 50 a spring 84, secured to the underside of the panel 11 and having a U-shaped end portion 85 engages a spherical journal 86 surrounding the shaft 79. With this structure, the spherical journal 86 will automatically align itself with the pin 79 as the latter is urged against the turntable 50 so that substantially constant pressure is maintained therebetween. Thus a simplified highly effective and stable drive is provided that will provide a considerably higher degree of speed control than is necessary for recording heart sounds. While a high degree of speed regulation is attained with the foregoing apparatus, the recording and reproduction of heart sounds merely requires a relatively constant speed during recording and reproduction and a record made at one speed need not be reproduced at precisely the same speed. By reason of the specific turntable drive embodied in this invention the load imposed on the motor by reason of the driving mechanism and the friction between the driving pin and the turntable is substantially constant so that little or no speed variations are experienced. In addition it will be shown that the load placed on the turntable by coaction of the record with the recording and reproducing means is also substantially uniform so that very high degrees of speed control are obtained.

Figure 13:
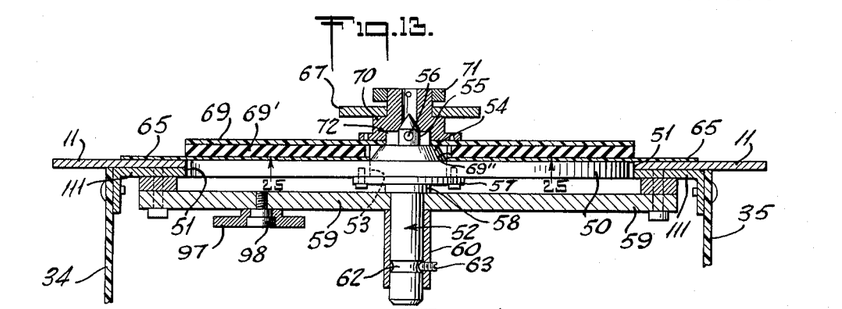
Figs. 13, 14 and 15 are cross sectional views of Fig. 12 taken along the lines 13—13, 14—14 and 15—15 thereof.
Figures 13A, 15:
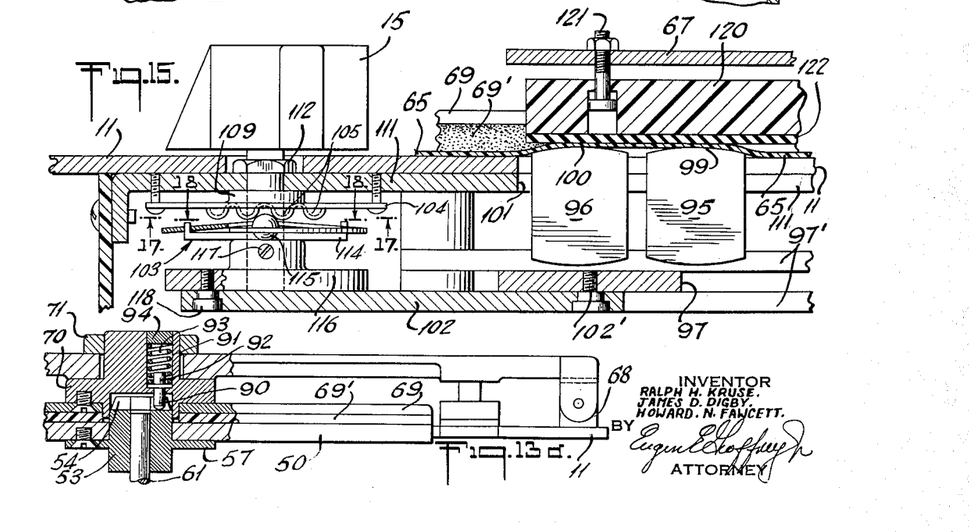
Fig. 13a is a cross sectional view of a modified embodiment of the hub elements of the recording turntable.
Figure 14:
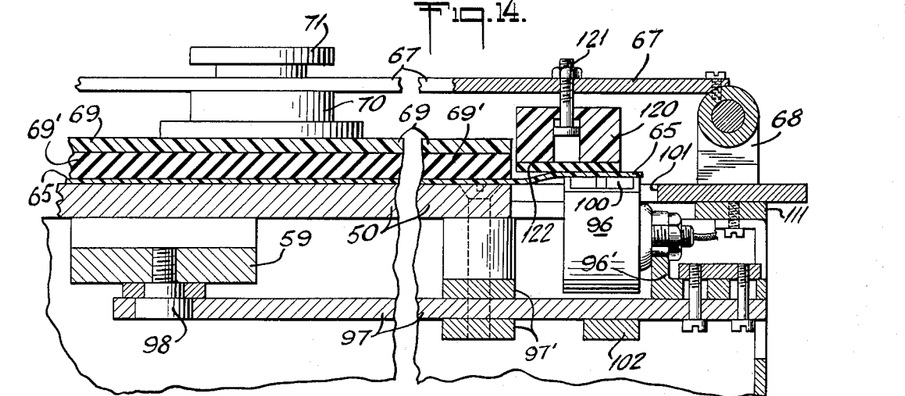
Figure 16:
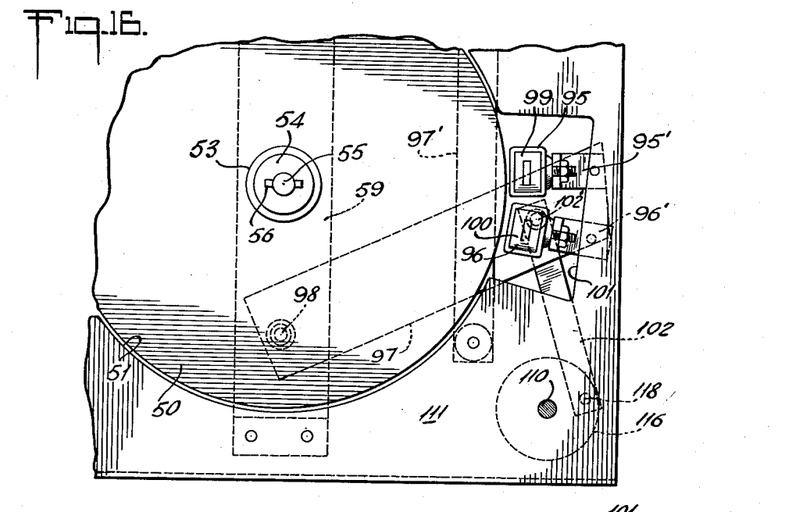
Fig. 16 is a fragmentary section of Fig. 12 to illustrate the operation of the magnetic recording heads for recording successive concentric paths on the magnetic recording disk.
Figure 17:
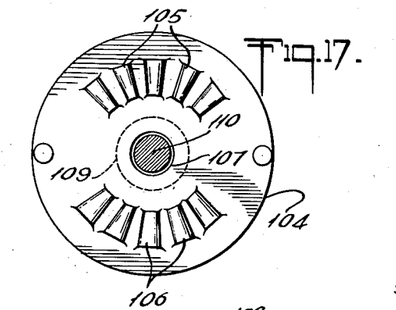
Fig. 17 is a cross sectional view of Fig. 15 taken along the lines 17—17 thereof to show certain details of the recording and reproducing head positioning means.
Figure 18:
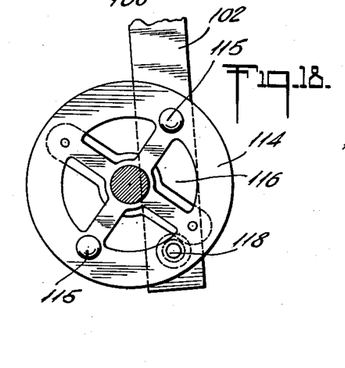
Fig. 18 is a cross sectional view of Fig. 11 taken along the lines 18—18 thereof to illustrate additional details of the head positioning means.
Figure 19:
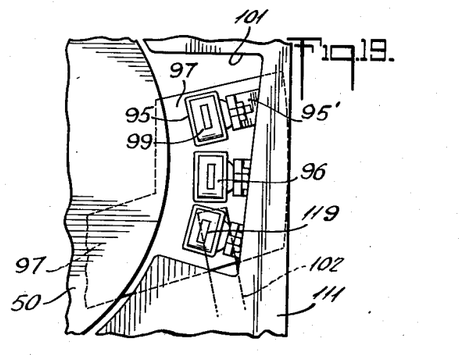
Figs. 19 and 20 illustrate a modified embodiment of the recording and reproducing head assembly to obtain improved signal noise ratio.
Figure 20:
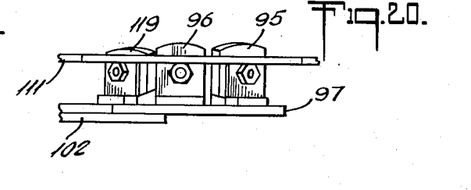

Referring again to the overlying plate assembly 67, in certain instances it may be desirable to utilize an alternative structure for insuring positive engagement between the turntable 50 and the overlying plate 69. A modified embodiment of this aspect of the invention is illustrated in Fig. 13a. It is similar to the embodiment of the invention shown for instance in Fig. 13 in that the turntable 50 is carried by a central hub 53 and the upper plate 69 is carried by a hub 70 rotatably carried by a transverse lever 67 pivoted at 68 to the top panel 11. It will be observed however in this form of the invention that the central aligning stud 55 and transverse pin 56 are omitted. In place thereof at least one vertically disposed opening 90 is formed in the upper side of the hub 53 and offset from the central shaft 61. The upper hub 70 carrying plate 69 has a vertical opening 91 therein carrying a slidably mounted pin 92 and a spring 93 for urging the pin downwardly against the bottom of the opening 91. The top of the opening 91 is closed by a suitable plug 94. With this arrangement as the upper plate 69 is lowered into position over the turntable 50 the bottom end of the pin 92 will bear against the upper surface of the lower hub 53. As soon as the turntable is rotated and the opening 90 in the lower hub is brought into alignment with the pin, the latter will snap downwardly to engage the opening 90 and thus couple the turntable 50 and the plate 69 one to the other. With this arrangement the record 65 is secured in place on the turntable 50 by the action of gravity on the plate 69.

Referring now to Figs. 2, 12 and 16 through 20, the magnetic recording and erasing heads are mounted in an opening 101 to one side of the turntable 50 and beneath the transverse lever 67 carrying the plate 69. In the embodiment of the invention shown in Fig. 16 for instance the heads are denoted by the numerals 95 and 96 with the head 95 functioning as an erasing head and the head 96 functioning as a recording and playback head. The operation of these heads for recording, reproducing and erasing signals on magnetic materials is well-known in the art and a detailed description thereof is not deemed necessary. These heads are fixedly mounted on the outer end of a horizontally disposed lever member 97 that is pivoted at its inner end to the transverse bracket member 59, supporting the turntable 50, by means of a suitable pin 98. It is held in a horizontal position by the bracket 97'. The heads 95 and 96 are secured to bracket member 97 by individual brackets 95' and 96' respectively and are arranged so that the record contacting surfaces 99 and 100 of the heads 95 and 96 are disposed slightly above the surface of the turntable 50. These surfaces 99 and 100 are also disposed approximately in line one with the other so that they will track in a single path about the edge of the magnetic record 65. As will now be described these may be moved within an opening 101 in the panel 11 in such a manner that they will trace concentric paths about the edge of the record 65 as they are moved from one position to another. Positioning of these heads is accomplished by a link 102 pivoted to the bracket member 97 at 102'. The outer end of this lever is coupled to a rotary positioning device generally denoted by the numeral 103 in Fig. 15 and shown in detail in Figs. 17 and 18.

This device includes a circular plate 104 having two opposing sets of downwardly formed indentations 105 and 106 and a central opening 107. The plate is provided with a hub 109 for rotatably receiving the central shaft 110 and for securing it to a plate 111, fastened to the underside of the panel 11, by means of a nut 112. The shaft 110 is rotated by the control knob 15. Beneath the plate 104 and fixedly secured to the shaft 110 is a rotary member 114 carrying a pair of oppositely disposed ball bearings 115 which cooperate with the depressed portions 105 and 106 in the plate 104. Thus as the shaft 110 is rotated the balls 115 on the member 114 in cooperation with the depressions 105 and 106 will define four precisely determined positions since the balls will come to rest between adjoining indents 105 and 106 as may be observed in Fig. 15. Beneath the plate 114 is a bell crank 116 fixed to the shaft 110 by a set screw 117 and coupled to the outer end of the link 102 by a suitable pivot screw 118. Thus as the knob 15 is rotated the recording and erasing heads 95 and 96 will be moved through an arc defined by the pivot 98 and thus move inwardly and outwardly of the turntable as may be viewed in Fig. 16. By properly adjusting the angular positions of the shaft 110 and the heads 95 and 96, the latter can be made to define two or more separate and distinct circular paths about the magnetic record 65. In this particular embodiment of the invention four such paths are provided so that four distinct recordings may be made on a given record. Since the record is of circular configuration its use for heart sound recording enables the doctor or physician to write on the record itself for the purpose of identifying the recordings made on each of the individual channels or circular recording paths.

As previously pointed out the signal-to-noise ratio in a recorder of this character is important since some of the heart sounds are of very low amplitude and difficult to detect. Magnetic recording heads by reason of their very nature must have one or more pole pieces completely open for contact with the record itself and this requirement exposes the magnetic coil disposed within the head to the influence of external fields such as those produced by transformers, motors and the like. In order to reduce the effect of external fields on the recording and reproducing head 96 an auxiliary recording and reproducing head 119 is mounted in contiguous relationship with the head 96 but is spaced downwardly from the head 96 a sufficient distance so that it will not contact or influence the magnetic record as it passes over the surface of the head 96. By connecting these coils in phase opposition and providing a common magnetic link between them, any hum picked up by the respective coils of the heads 96 and 119 will be cancelled out and at the same time the signals to be recorded or reproduced will not be influenced in any way by external fields. This system therefore provides a simple, effective and positive method of further reducing the signal-to-noise ratio.

In magnetic recording and reproducing of signals the magnetic record must be brought directly in contact with the recording and erasing heads in order to impress the maximum energy on the record and of course obtain maximum pick up therefrom when reproducing the record. Unduly great pressure will produce considerable wear on the record as well as the recording and erasing heads. In order to carefully control the pressure of the record 65 on the heads 95 and 96 as it passes thereover and to effect ready engagement and disengagement of the record and the heads, means are provided in the form of a weighted member 120 as may be viewed in Figs. 9, 10, 14 and 15. This member is mounted on the transverse bracket member 67 by a pair of screws 121 which engage suitable openings in the weight 120 and are secured to the bracket 67. Sufficient play is provided so that the pressure of the record 65 on the heads 95 and 96 will be determined solely by the weight of the member 120. Since the record is moved relative to the weight 120, a suitable material such as felt or the like denoted by the numeral 122 is provided on its under surface. With this arrangement as the lever or bracket member 67 is lifted to remove the pressure plate 69 from the surface of the turntable 50 it will also lift the weight 120 out of engagement with the record so that the latter may be removed and another replaced without the necessity for special threading or adjusting operations.

Figure 21:
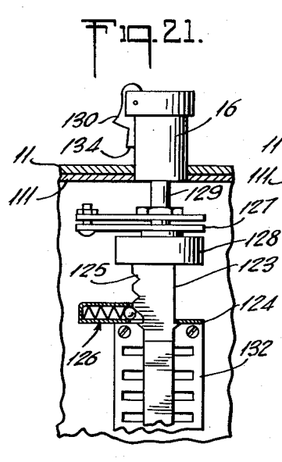
Figs. 21 and 23 are three views of a combination volume control and switch assembly for use in controlling the operation of the recorder.
Figure 22:
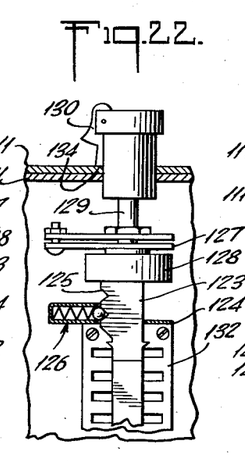
Figure 23:
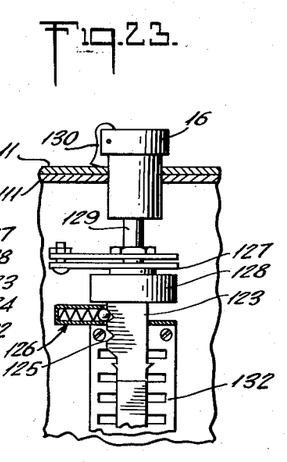
Figure 24:
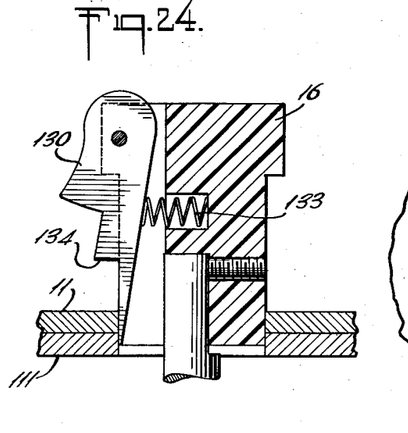
Fig. 24 is an enlarged cross sectional view of the control knob of the switch shown in Figs. 21 through 23 inclusive.
Figure 25:
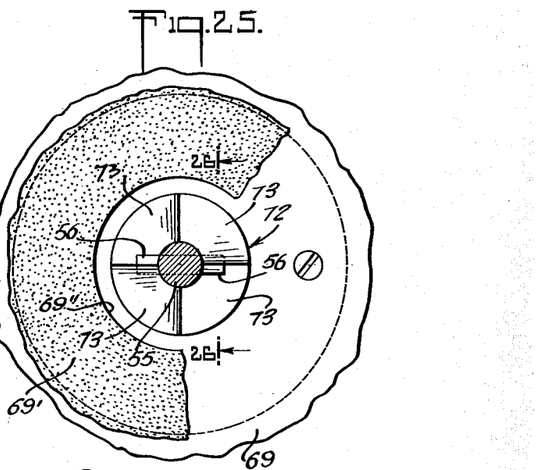
Fig. 25 is a partially sectioned top view of the turntable.

In the operation of a device of this character and especially when it is used by doctors and physicians for the recording of heart sounds it is essential that simple and direct control of the recorder be provided since the doctor must very often be required to use one hand to hold the microphone or pick up device on the patient and operate the recorder at the instant he hears a particular sound or sounds he wants to record without fumbling with the adjustments. For this purpose a special control is provided which not only enables the operator to adjust the recording gain but also to change the apparatus from a listening position to a play back position and to a recording position through the use of but a single knob. This adjusting and switching arrangement is shown in Figs. 21 to 24 inclusive. It includes a vertically reciprocable bracket member 123 suitably supported by a plate member 124 and having a set of notches 125 in one side thereof. A ball and spring assembly 126 cooperates with these notches and defines in the illustrated embodiment of the invention three definite and distinct vertical positions to which the reciprocable member 123 may be moved. The upper end of the bracket member 123 is provided with a transverse portion 127 having a central hole therein to receive and hold a volume control 128 having an upwardly extending shaft 129 for the operation thereof. This shaft extends upwardly through the panel 11 and carries a knob 16. With the arrangement thus far described rotation of the knob 16 will operate the control 128 which is connected in this embodiment of the invention to control the gain of the equipment in recording and listening positions. A second reciprocable bracket member 131 overlies the bracket member 123 and is carried thereby. This bracket member functions to operate switching means 132 shown for present purposes in somewhat diagrammatic form and adapted to shift connections within the apparatus so that the head 96 can be used for either recording or reproducing purposes. In the present embodiment of the invention the upper position of the control knob 16 as shown in Fig. 21 will provide for playing back the signal appearing recorded on the record. The middle position in Fig. 22 is for listening directly to the microphone signal. The knob 16 may be freely moved between these two positions without the actuation of the control lever 130 on the side of the control knob. In order to move the knob 16 into the recording position as shown in Fig. 23 the lever or stop 130 is moved inwardly against the action of a spring 133 as viewed in Fig. 24 so that the notch 134 on the stop 130 will clear the edge of the panel 11 and permit the knob to be moved downwardly to the third position shown in Fig. 23. Thus the operator of the machine need not even look at the control panel as all necessary operations for listening and recording can be performed by the actuation of a single knob.

Figure 27:
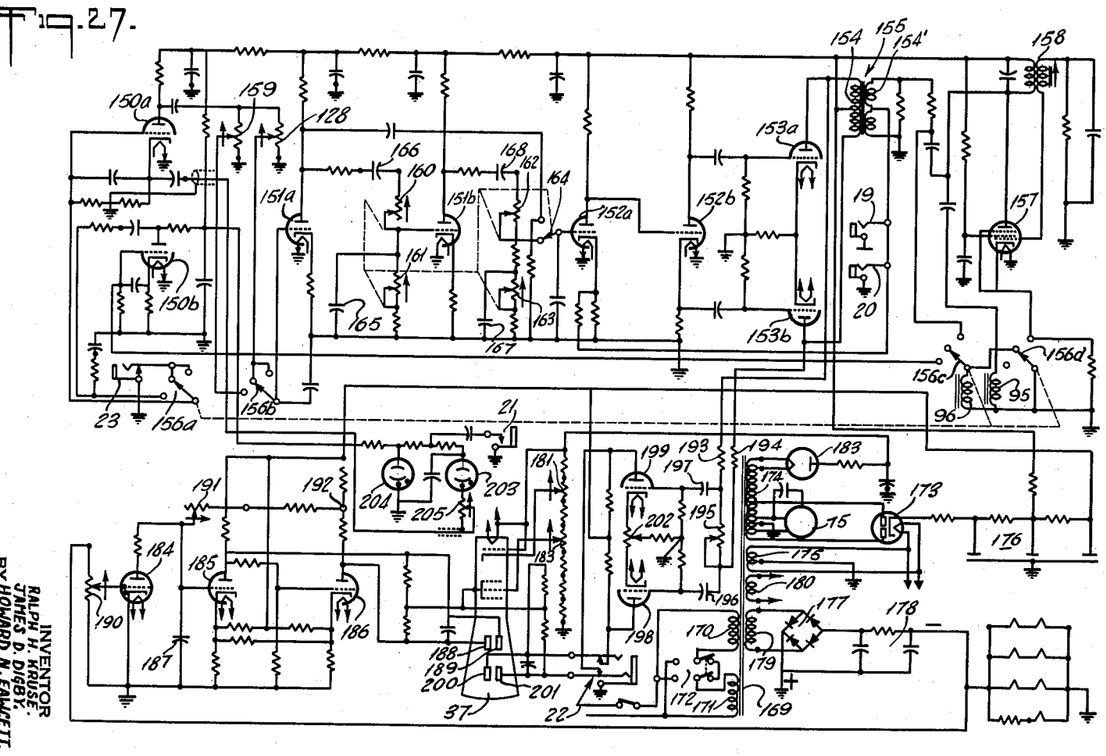
Fig. 27 is a circuit diagram of the apparatus in accordance with the invention.

Before discussing the circuit diagram shown in Fig. 27 of the drawings reference is made to Fig. 5 and specifically to the control generally denoted by the numeral 135 which enables the operator upon playing back a record to modify the frequency response thereof to accentuate particular frequencies. In the reproduction of heart sounds by electronic means it is essential that realism in reproduction be retained at all times so that the physician can properly interpret a record as though he were listening to the original sound by means of a conventional stethoscope. At the same time it is desirable to accentuate frequencies characteristic of certain heart defects in order to facilitate their detection. It has been found that both of these ends can be attained through the utilization of an adjustable filter such as that illustrated at 135 and described more fully in connection with the specific circuit of Fig. 27. This filter is arranged to reproduce at all times substantially the entire frequency range of heart sounds. This is a range of about 100 to 600 cycles per second. In addition, any frequency within that range can be peaked for emphasis, with the frequencies on either side of the peak being attenuated at a rate of 6 to 12 decibels per octave. It has been found that by substantially balancing the degree of attenuation on either side of a central frequency that excellent realism in the reproduction of the sounds can be maintained and at the same time individual frequencies accentuated.

Referring now to Fig. 27 the recording and reproducing amplifier comprises a series of dual triodes 150 to 153 inclusive though of course it is apparent that other types of tubes and transistors may be employed.

Broadly the sections A and B of the tube 150 comprise the input circuit for the amplifier and are coupled in a conventional manner by resistance and capacity means to the tube 151A. This tube is in turn coupled by suitable resistance and capacitance circuits to the tube 151B and thence to the tube 152A. The tubes 151B and 152A include resistance capacity filters in the grid circuits for the purpose of obtaining selected frequency emphasis as previously described. Means are also provided for cutting this filter in and out of the circuit. Direct coupling is used between the tubes 152A and 152B, the latter being a phase inverter for driving the tubes 153A and 153B in push pull. The amplified signal then appears across the primary 154 of the output transformer 155.

The recording reproducing switch actuated by knob 16 and shown in Figs 21 to 23 of the drawings is actually a four pole triple throw switch with the four banks and denoted in the circuit diagram by the numerals 156A to 156D, respectively, and the individual contacts are denoted by the letters P, L and R for play back, listen and record, respectively. When the switch is in the middle or listening position the microphone jack 23 is coupled through the switch bank 156A to the input grid of the tube 150A. The output from the plate of 150A is then fed to the grid of the tube 151A through the recording volume control 128 operated by the knob 16 and connected into the circuit by the switch 156B. The signal from the microphone is then amplified by the other tubes as previously described and the signal can be heard through a listening stethophone 32 connected with jacks 19 or 20 which in turn are interconnected with the secondary 154' of the output transformer 155. It will be observed that a portion of the signal applied to the listening jacks 19 and 20 is also fed back to the cathode of the tube 152A in order to obtain more uniform response from the amplifier. It will further be observed that during the listening period the switch 156D functions to apply a short circuit to the recording head so that no signal can be impressed on the record while in a listening position.

When the switch 156 is moved to the record position the microphone connected to the jack 23 remains interconnected with the grid of the input tube 150A. The volume control 128 remains in the grid circuit of the tube 151A so that nothing has been changed thus far with reference to the amplifier circuits. Referring now to switch 156C it will be observed that the recording head has been interconnected with the secondary 154' of the output transformer 155 so that the signal thereon will be impressed on the recording head. At the same time a high frequency erasing signal generated by an oscillator including the tube 157 and the transformer 158 applies energy to the erasing coil 95 which erases any information that may be on the record channel prior to the action of the recording head 96. In addition a small amount of the erasing signal is applied to the recording head 96 for biasing purposes well-known in the art.

After a record has been recorded it can be played back by moving the switch 156 to the play back position. In this position it will be observed that the switch 156C connects the recording head 96 directly to the grid of the amplifier tube 150B. The output of this tube is then connected through the switch 156A to the grid of the tube 150A in order to provide additional gain to compensate for the lower signal level of the recording head 96 as compared to the microphone connected with the jack 23. This signal is then amplified and appears at the listening jacks 19 and 20. The play back gain is controlled by the volume control 159 and operated by the knob 17 as seen in Fig. 1. This play back control is connected in the grid circuit of tube 151A by the action of switch 156B as may be clearly observed in the drawing.

The frequency response control 135 actuated by the knob 18 includes four separate simultaneously-operated potentiometers 160 to 163. The controls 160 and 161 are connected in series one with the other and with the grid of the tube 151B while the controls 162 and 163 are effectively connected in series one with the other and with the grid of the tube 152A through a control switch 164. The four controls are moved in synchronism and cooperate with condensers 165, 166, 167 and 168 as well as associated resistors to produce the adjustable frequency response curve previously described. These controls together with switch 164 are simultaneously actuated by the knob 18 and in one position of the knob 18 the switch 164 is actuated to connect the grid of the tube 152A directly with the plate of the tube 151A thus bypassing the frequency response control system.

While a specific method of obtaining frequency accentuation is illustrated in Fig. 27 it is apparent that other systems may be employed with similar results. For instance, a relatively high gain tube may be employed with suitable feed back means to vary the response of the stage in the desired manner.

The power for the amplifier and erasing oscillator as described above is provided by a power transformer 169 having a pair of primaries 170 and 171 interconnected with a control switch 172 to permit operation on either 110 volts or 220 volts A.C. The rectified B voltage for the amplifier and oscillator is provided in the conventional manner by a full wave rectifier tube 173 interconnected with a portion of the secondary winding 174. The filament of the tube 173 is heated by a winding 175 and the output voltage is filtered by a filter generally denoted by the numeral 176 and fed to various elements of the amplifier and oscillator. The tubes 150, 151, 152 and 157 are heated by direct current obtained by means of a full wave rectifier 177 and filter 178 interconnected with the secondary winding 179. The other tubes in this apparatus with the exception of the cathode ray tube 37 are heated by the winding 175 while the cathode ray tube 37 is heated by the winding 180. Voltage for operating the turn table drive motor 75 is obtained from part of the secondary winding 174.

The cathode ray tube 37 for visually displaying the signals reproduced by the amplifier described above is connected in a conventional manner with intensity and focus controls denoted by the numerals 181 and 182, respectively, and operated by the control knobs 24 and 25 on the front panel 12. The voltage for operating the tube 37 is obtained by a suitable high voltage rectifier 183 interconnected with the winding 174 to produce the desired high negative accelerating potential.

The sweep frequency oscillator for moving the beam of the tube 37 transversely of its face includes three tubes 184, 185 and 186. The tube 184 is preferably a thyratron oscillator which together with the condenser 187 produces a saw tooth wave required to produce the desired sweep signal. This signal is coupled to the grid of tube 185 which is in turn directly coupled with the grid of the tube 186 and tubes 185 and 186 combine to produce a push pull output signal that is applied to the horizontal deflection plates 188 and 189 of the tube 37. A negative voltage from the filter 178 is applied to the grid of the oscillator tube 184 through a potentiometer 190. This control adjusts the termination of the horizontal sweep of the cathode ray beam and is controlled by an adjustment mounted on panel 34. The control 191 interconnected with the plate circuit of the tube 184 controls the frequency of the oscillation and is adjusted by the control knob 28 on panel 12. It will be observed that the voltage for the tube 184 is obtained by a tap 192 in the plate circuit of the tube 186. This is a feed back system which provides a changing plate voltage for controlling the rate at which the condenser 187 is charged by the tube 184. In this way the linearity of the sweep is automatically maintained.

The signal to be reproduced on the cathode ray tube is obtained from the plates of the tubes 153A and 153B and fed through a pair of resistors 193 and 194 to a variable resistor 195. This resistor is the height control operated by the knob 26 on the front panel 12 and it controls the potential applied through the condensers 196 and 197 which feed the grids of the tubes 198 and 199. The amplified signal on the plates of the tubes 198 and 199 is fed through contacts on the jack 22 to the plates 200 and 201 of the cathode ray tube 37. These are the vertical plates and operate to deflect the horizontal beam in vertical directions to reproduce the heart sound signal. The signal applied to the plates 200 and 201 can be centered in the cathode ray tube by means of a control 202 connected between the cathodes of the tubes 198 and 199 and the ground by balancing the plate currents therein. With the arrangement thus far described all signals appearing at the plates of the tubes 153A and 153B will be displayed on a cathode ray tube 37 whether the switch 156 be in the play back, listening or record positions.

As previously pointed out it is desirable with a heart sound recorder to provide means for coordinating the heart sound record with an electrocardiograph record taken at the same time since the coordination of the two records aid materially in diagnosing heart ailments. To attain this end a signal from the electrocardiograph denoted by the numeral 31 in Fig. 1 is connected to the jack 21 and fed to an oscillator tube such as a two element gaseous voltage regulator tube denoted herein by the numeral 203. This tube is supplied by a regulated source of voltage obtained by means of a second regulator tube 204. One element of the tube 203 is fed through a variable resistor 205 operated by the control knob 27 on the front panel to control the height of the signal produced by the oscillator tube 203. This signal is fed into the cathode of the amplifier tube 150A. With this arrangement the R wave of the electrocardiograph signal is sufficient to cause the tube 203 to oscillate momentarily at a high frequency but within the audio frequency range of the equipment. This high frequency or beep signal can be heard on the stethophones 32, will be observed on the face of the cathode ray 37 and can be recorded and reproduced on the record 65 in order to secure positive coordination between the heart sound recordings and the R wave of a corresponding electrocardiograph.

In certain instances it may be desirable to reproduce the entire electrocardiograph signal on the cathode ray tube 37. This is accomplished by disconnecting the electrocardiograph from the jack 21 and interconnecting it with the jack 22. The insertion of the electrocardiograph plug into jack 22 disconnects the signal from the tubes 198 and 199 from the vertical plates 200 and 201 of the cathode ray tube and applies the electrocardiograph signal directly to those plates. The gain of the reproduced signal can of course be controlled by means on the electrocardiograph 31.

The embodiment of the invention as described above provides a highly portable and dependable device that not only enables the recording of the heart sounds to avoid unnecessary disturbances of a patient but provides a permanent record that can be carefully analyzed and compared from time to time with other records of the same patient to determine the progress being made in treatment of a given ailment. Moreover, it further enables a more detailed frequency analysis of a record to facilitate detection of imperfections in the operation of the heart. In addition to these important advantages the apparatus can be directly coordinated with electrocardiograph apparatus to provide a more complete and definite picture of the operation of the heart so that a more rapid and certain analysis of the heart sounds can be made. Furthermore the unit embodies an improved recorder characterized by its simplicity and stability and wherein the record is of such a nature that it can be readily folded and sent through the mail without in any way affecting the reproducibility of a record contained thereon since as pointed out creases and wrinkles in the edge of the record by reason of this improved arrangement of elements does not introduce noise or other sounds that would interfere in any way with the interpretation of the heart sound recording.

Although the recording apparatus as described utilizes four discrete paths for making separate recordings, it is apparent that the recording heads may be actuated by suitable screw-threaded means driven by the turntable motor and thereby describe a spiral path about the record.

While only one embodiment of the invention has been illustrated and described, it is apparent that changes, modifications and alterations may be made without departing from the true scope and spirit thereof.

What is claimed is:

1. A heart sound recorder comprising a panel, magnetic disk recording apparatus mounted on one side of said panel, a cathode ray tube including a housing therefor extending from said panel, a pair of sheets of insulating material extending from the other side of said panel in parallel relationship one to the other and in alignment with a pair of opposing edges of said panel, said sheets of insulating material each carrying a printed electronic circuit thereon including means for supporting component parts of said circuits, a drive motor disposed centrally of the other side of said panel and between said sheets of insulating material for driving said recording apparatus and a plurality of controls on said panel including adjustable filter means interconnected with said amplifier for accentuating predetermined frequencies of said heart sounds and a combination control interconnected with the amplifier and movable perpendicularly of said panel for listening to the sounds to be recorded, recording said sounds and monitoring them simultaneously therewith and for playing back said recorded sounds and rotatable to control the volume at which said sounds are recorded.

2. In a heart sound recorder, sound recording means, an audioamplifier including a continuously variable band pass filter, a microphone, means for interconnecting said amplifier with said microphone and recording means, audible reproducing means for listening to the microphone signal amplified by said amplifier, visual reproducing means including a cathode ray tube and a controlled sweep generator interconnected therewith, means for interconnecting the output of said amplifier with said cathode ray tube, means including an oscillator interconnected with said amplifier and responsive to an electrocardiographic signal to produce a periodic marking signal for coordination of the recorded heart sounds with an electrocardiographic record taken simultaneously with the recording of said heart sounds, and means for displaying an electrocardiographic signal on said cathode ray tube while listening to said heart sounds.

3. Portable heart sound recording apparatus comprising heart sound recording means including an amplifier, a turntable, a flexible disk removably carried by said turntable and having a diameter greater than said turntable, at least one fixed magnetic head having a disk engaging surface for engagement with one surface of the disk portion extending beyond the edge of the turntable and means aligned with said head and engaging the other surface of the disk to urge the disk in engagement with the head, and means for audibly and visibly reproducing said recorded sounds, including means responsive to an electrocardiographic signal to produce a periodic marking signal and means for recording and displaying said marking signal simultaneously with said heart sound signal.

4. Signal recording apparatus comprising flexible magnetic disk recording means including an amplifier for recording signals, said disk recording means including a circular disk of relatively thin pliable material for recording magnetic impulses, a driven turntable having a diameter less than the diameter of said disk whereby at least a substantial peripheral part of said disk overhangs said turntable, at least one magnetic head engaging said overhanging part of said disk, and means urging said disk against said head, said disk conforming with the contour of the head as it moves relative thereto, means coupled with said amplifier for audibly reproducing said signals simultaneously with the recording thereof, a cathode ray tube coupled with said amplifier for visually displaying said signals during the recording thereof and means for audibly and visually reproducing the recorded signals.

5. Portable heart sound recording and reproducing apparatus comprising a driven turntable, a relatively thin pliable magnetic disk carried by said turntable and extending substantially beyond the edge thereof, a magnetic head engaging said overhanging part of said disk, means urging said disk into contact with said head and causing said disk to conform with the contour of the head as it moves relative thereto, a heart sound transducer and amplifier interconnected with said head, means connected with the amplifier for audibly reproducing the heart sounds during the recording thereof, and a cathode ray tube coupled with said amplifier, said cathode ray tube and the last said reproducing means visually and audibly reproducing said recorded sounds.

6. Portable heart sound recording apparatus comprising a turntable including driving means therefor and a central spindle extending upwardly from said turntable, said turntable being adapted to receive a flexible disk of magnetic material having a central opening therein for engagement of said spindle to align the record on the turntable, said disk having a diameter greater than said turntable, a circular plate overlying said turntable and engaging said spindle to frictionally secure said disk to said turntable, at least one fixed magnetic head spaced from the edge of said turntable for engagement with one surface of the magnetic disk, means aligned with said magnetic head and engaging the other surface of said disk to urge the disk into engagement with said head, amplifying means interconnected with said head to record said heart sound signals, means to audibly and visibly reproduce said recorded signals and means interconnected with said visual reproducing means to feed an electrocardiographic signal thereto and visually displaying said signal simultaneously with the audible reproduction of said heart sound signals.

7. Portable heart sound recording and reproducing apparatus comprising a driven turntable, a relatively thin pliable magnetic disk carried by said turntable and extending substantially beyond the edge thereof, a magnetic head engaging said overhanging part of said disk, means urging said disk into contact with said head and causing said disk to conform with the contour of the head as it moves relative thereto, a heart sound transducer and amplifier interconnected with said head, means connected with the amplifier for audibly reproducing the heart sounds during the recording thereof, and a cathode ray tube coupled with said amplifier, said cathode ray tube and the last said reproducing means visually and audibly reproducing said recorded sounds and filter means interconnected with at least said audible reproducing means for adjustably controlling the range and magnitude of the signal frequencies reproduced.

8. Portable heart sound recording and reproducing apparatus comprising a driven turntable, a relatively thin pliable magnetic disk carried by said turntable and extending substantially beyond the edge thereof, a magnetic head engaging said overhanging part of said disk, means urging said disk into contact with said head and cause said disk to conform with the contour of the head as it moves relative thereto, a heart sound transducer and amplifier interconnected with said head, means connected with the amplifier for audibly reproducing the heart sounds during the recording thereof, a cathode ray tube coupled with said amplifier, said cathode ray tube and the last said reproducing means visually and audibly reproducing said recorded sounds and means interconnected with said visual reproducing means to feed an electrocardiographic signal thereto and visually displaying said signal simultaneously with the audible reproduction of said heart sound signals.

9. Portable heart sound recording and reproducing apparatus comprising a driven turntable, a relatively thin pliable magnetic disk carried by said turntable and extending substantially beyond the edge thereof, a magnetic head engaging said overhanging part of said disk, gravity actuated means urging said disk into contact with said head and causing said disk to conform with the contour of the head as it moves relative thereto, a heart sound transducer and amplifier interconnected with said head, means connected with the amplifier for audibly reproducing the heart sounds during the recording thereof, and a cathode ray tube coupled with said amplifier, said cathode ray tube and the last said reproducing means visually and audibly reproducing said recorded sounds.

References Cited in the file of this patent

UNITED STATES PATENTS

| | | |
|---|---|---|
| 893,277 | Stuart | July 14, 1908 |
| 901,397 | Stuart | Oct. 20, 1908 |
| 907,383 | Lieb | Dec. 22, 1908 |
| 936,490 | Stuart | Oct. 12, 1909 |
| 1,011,322 | Clement | Dec. 12, 1911 |
| 1,156,976 | Clement | Oct. 19, 1915 |
| 1,681,628 | Schwartzkopf | Aug. 21, 1928 |
| 2,294,015 | Salb et al. | Aug. 25, 1942 |
| 2,341,396 | Smith | Feb. 8, 1944 |
| 2,341,750 | Williams | Feb. 15, 1944 |
| 2,351,008 | Camras | June 13, 1944 |
| 2,364,556 | Somers | Dec. 5, 1944 |
| 2,416,353 | Shipman et al. | Feb. 25, 1947 |
| 2,443,756 | Williams | June 22, 1948 |
| 2,457,744 | Sturm | Dec. 28, 1948 |
| 2,528,699 | Masterson | Nov. 7, 1950 |
| 2,598,613 | Simoni | May 27, 1952 |
| 2,661,459 | Schmidt | Dec. 1, 1953 |
| 2,684,468 | McClure | July 20, 1954 |
| 2,689,161 | Marchand et al. | Sept. 14, 1954 |
| 2,695,962 | Nibbe | Nov. 30, 1954 |
| 2,712,975 | Golseth et al. | July 12, 1955 |
| 2,716,874 | Wiley | Sept. 6, 1955 |
| 2,751,274 | Andrews | June 19, 1956 |
| 2,760,186 | Hall | Aug. 21, 1956 |

OTHER REFERENCES

Webster's New Collegiate Dict., 58th edition, published by G & C Merriam Co.